(12) United States Patent
Gordon

(10) Patent No.: US 6,285,298 B1
(45) Date of Patent: Sep. 4, 2001

(54) SAFETY CRITICAL SYSTEM WITH A COMMON SENSOR DETECTOR

(75) Inventor: Thomas M. Gordon, Ely, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/512,496

(22) Filed: Feb. 24, 2000

(51) Int. Cl.$^7$ .................................................. G08B 21/00
(52) U.S. Cl. ............................................. 340/945; 701/8
(58) Field of Search .................................... 340/945, 963, 340/442, 444, 507, 508, 511; 701/8, 9, 14, 34; 700/21, 79, 82; 714/47, 30

(56) References Cited

U.S. PATENT DOCUMENTS

| | | | |
|---|---|---|---|
| 3,505,641 | * | 4/1970 | Boskovich .......................... 340/292 |
| 4,464,661 | * | 8/1984 | Redmond ............................ 340/960 |
| 4,635,030 | * | 1/1987 | Rauch ................................. 340/945 |
| 5,001,638 | * | 3/1991 | Zimmerman et al. .......... 364/424.06 |
| 5,402,119 | * | 3/1995 | Feierstein .......................... 340/945 |
| 5,949,677 | * | 9/1999 | Ho ........................................ 701/8 |

* cited by examiner

Primary Examiner—John A. Tweel
(74) Attorney, Agent, or Firm—Nathan O. Jensen; Kyle Eppele

(57) ABSTRACT

An avionics system with a common sensor detector that includes analog sensors for sensing flight parameters of an aircraft and for providing sensor signals indicative of the flight parameters. Avionics computers compute flight parameter data associated with the sensor signals from the analog sensors. A primary flight display receives, processes, and displays the flight parameter data. The primary flight display includes inside limit data comparators to compare the flight parameter data from at least a same pair of flight computers to indicate a common sensor fault condition when the flight parameter data difference is zero or approximately zero for a predetermined period of time. Other safety critical systems may employ the common sensor detector.

20 Claims, 8 Drawing Sheets

SAFETY CRITICAL SYSTEM WITH A COMMON SENSOR DETECTOR

BACKGROUND OF THE INVENTION

This invention relates to safety critical systems such as avionics systems and nuclear power monitoring systems and specifically to avionics systems with several data sources or avionics sensor systems providing data to displays or to data input/output concentrators containing comparators that check the validity of the data.

A number of safety critical system applications such as avionics and nuclear power monitoring require data input from two or more similar or identical sensor systems to ensure the validity of the data. The data from one sensor system is compared to the data from another sensor system in a data comparator to ensure the validity of the data.

For safety in critical avionics applications, critical data must be validated by the avionics system. The data from such sources as dual aircraft engine indicating systems (EIS), dual attitude heading system (AHS) and dual air data system (ADS) is provided to a primary flight display (PFD) and a multifunction display (MFD) or an input/output concentrator (IOC) containing data comparator functions. The data comparators in the PFD, MFD, or the IOC establish data reasonableness and validity by comparing the data from the dual sources. When a comparator indicates that the data from one source is significantly different than the other, pilots evaluate all their data sources for reasonableness and deselect the invalid or misleading source from their PFD and MFD. In a highly integrated avionics system, the integrity of the data to the data comparators must be considered.

Complex avionics systems require the introduction of multiple critical sensor data into an IOC device. New avionics systems may use as many as three or more AHS, three ADS, and three EIS sensor systems providing data to an IOC. The IOC sends the concentrated data from the multiple data sources to using systems on board the aircraft such as the primary flight display, the multifunction display, and a flight control system (FCS) on an Ethernet bus or other digital bus. The Ethernet bus itself is protected with a CRC (cyclic redundancy check) to protect against misleading critical data.

A failure mode in the IOC, the PFD, the MFD, or elsewhere may exist that may cause data from one sensor to masquerade as data from another sensor. For example the data from one ADS in a dual ADS system may be present at the second ADS input to a PFD well as its own input to the PFD. This potential failure has been a cause for concern to avionics system and flight control system designers for years. This concern has led to inputting some of the critical data from the dual ADS and the dual AHS directly to the FCS. This approach is no longer feasible with the new complex avionics systems with multiple sensor sources, data concentrators, and high speed data buses.

What is needed is a common sensor detector to detect failures where one sensor is masquerading as another and indicate the failure on a display in safety critical applications such as nuclear power plant monitoring and avionics systems. The common sensor detector should work with conventional systems as well as systems employing multiple sensors, data concentrators, and high speed data buses.

SUMMARY OF THE INVENTION

An avionics system with a common sensor detector is disclosed. The avionics system comprises two or more air data systems for measuring air data parameters. The air data systems further comprise a plurality of pressure and temperature sensors for providing pressure and temperature sensor data. Two or more air data computers compute air data flight parameter data associated with the pressure and temperature sensor data from the plurality of pressure and temperature sensors. The avionics system also comprises two or more attitude heading systems for measuring flight parameter data and the attitude heading systems further comprise a plurality of flux detector, rate gyro, and accelerometer sensors for providing flux detector, rate gyro, and accelerometer sensor data. The attitude heading system also comprises two or more attitude heading computers for computing attitude and heading flight parameter data associated with the flux detector, rate gyro, and accelerometer data from the plurality of flux detector, rate gyro, and accelerometer sensors. The avionics system comprises one or more flight displays for receiving, processing, and displaying the air data and attitude and heading flight parameter data. The flight displays further comprise a plurality of inside limit data comparators to compare the data from the air data computers and the attitude heading computers to indicate a common sensor fault condition when the data difference from what should be different analog sensors is zero or approximately zero for a predetermined period of time.

A safety critical system employing the common sensor detector is disclosed. The safety critical system comprises a plurality of analog sensors for sensing safety critical system parameters and for providing sensor data associated with the safety critical system parameters to a plurality of computers. The computers receive the sensor data and compute system parameter data associated with the sensor data from the plurality of analog sensors. A data display receives the system parameter data from the computers for processing and displaying. The data display further comprises a plurality of inside limit data comparators to compare the system parameter data from at least a same pair of the plurality of computers to indicate a common sensor fault condition when the system parameter data difference is zero or approximately zero for a predetermined period of time.

It is an object of the present invention to detect common sensor faults in a safety critical system.

It is an object of the present invention to detect a common sensor fault in an avionics system with an inside limit data comparator.

It is an advantage of the present invention to detect common sensor faults in a display or input/output data concentrator.

It is a feature of the present invention to display common sensor faults on a display.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
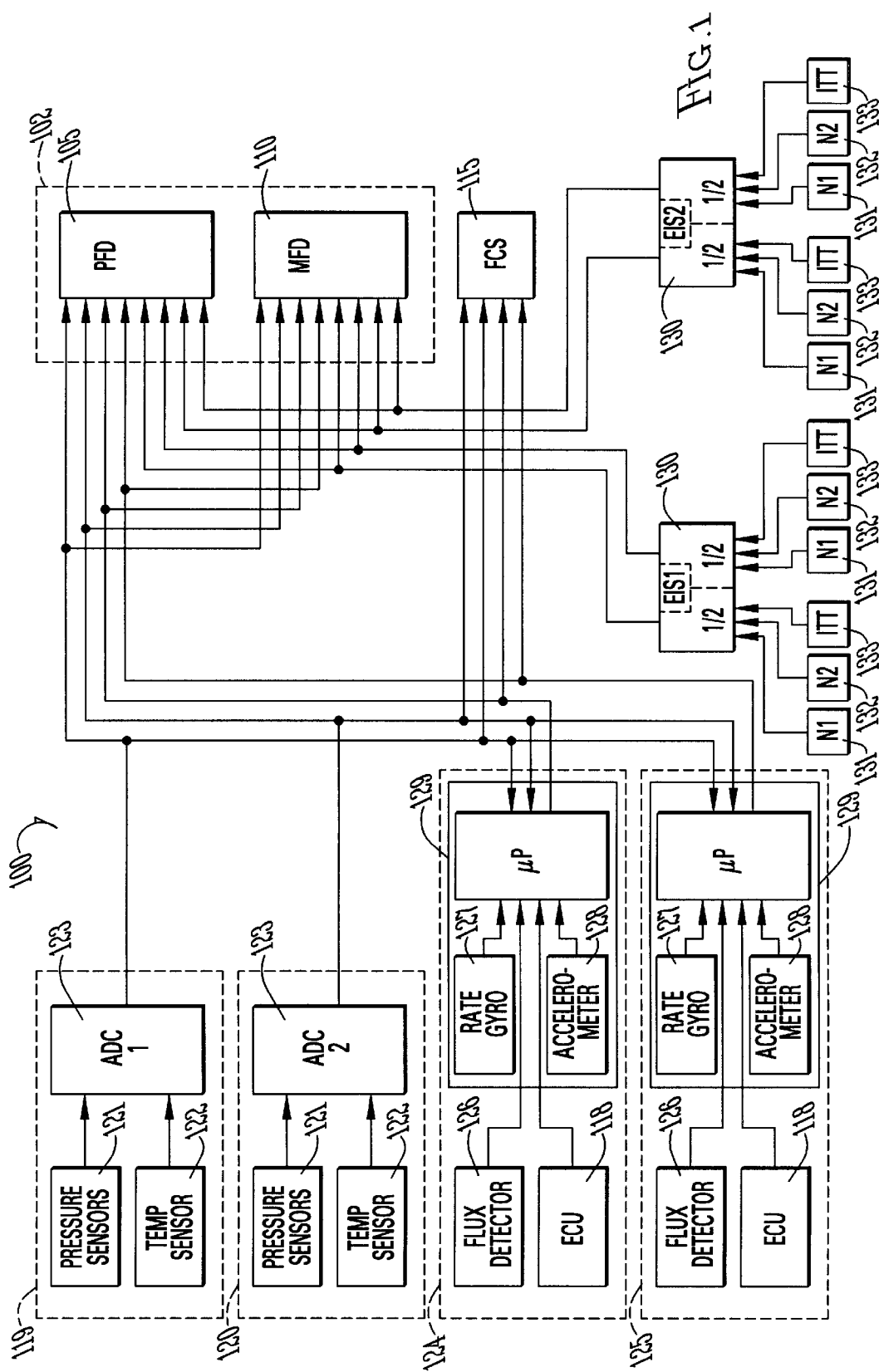
FIG. 1 is block diagram of an avionics system with multiple sensors connected directly to the primary flight display, a multifunction display and flight control system.

An avionics system 100 that may employ the present invention is shown in exemplary fashion in FIG. 1. The avionics system 100 shown in FIG. 1 is intended for installations in such aircraft as business aircraft, airliners, and other aircraft that require dual avionics sensor systems with high reliability, high integrity, and high flight safety standards. The present invention may be employed in similar safety critical systems for other applications.

The avionics system 100 shown in FIG. 1 comprises an electronic flight instrument system (EFIS) 102 that includes two electronic flight displays that function as a primary flight display (PFD) 105 and a multifunction display (MFD) 110. A PFD 105 and MFD 110 are typically mounted in front of both a pilot and a copilot. Also included in the avionics system 100 is a flight control system (FCS) 115 or autopilot for guiding the aircraft. The PFD 105, MFD 110, and FSC 115 receive data inputs from various sensor systems in an aircraft installation. In the example of FIG. 1 are two air data systems (ADS) 119 and 120 that each include analog pressure sensors 121, an analog temperature sensor 122, and an air data (ADC) computer 123. Also included are dual attitude heading systems (AHS) 124 and 125 that each include a flux detector 126, and rate gyros 127 and accelerometers 128 mounted within an attitude heading computer (AHC) 129. Two engine indication systems (EIS) 130 provide engine related data to the PFD 105 and the MFD 110 from sensors such as turbine speed sensors N1 131 and N2 132 and inter turbine temperature (ITT) sensors 133. The example in FIG. 1 shows two of each avionics sensor system but three or more may be installed in an avionics system. Other avionics sensor systems not shown in FIG. 1 may be included in the avionics system 100 such as radio altimeter systems and a weather radar system.

The dual air data systems 119 and 120 each comprise the analog pressure sensors 121 and the analog temperature sensor 122 and the air data computer 123. The pressure sensors 121 and the temperature sensor 122 sense parameters associated with the flight of an aircraft and provide sensor signals associated with these flight parameters. The air data computer receives pitot and static pneumatic and air temperature sensor signals from the appropriate pressure sensors 121 and the temperature sensor 122 to compute air data parameters such as pressure altitude, BARO corrected altitude, barometric pressure, total pressure, static pressure, vertical speed, indicated airspeed, total air temperature, static air temperature, and others. This processed air data is provided to the FCS 115, AHS 124 and 125, MFD 110, PFD 105, and other aircraft systems such as navigation systems (not shown) requiring such data.

The dual attitude heading systems 124 and 125 each comprise an attitude heading computer 129, an electronic compensation unit (ECU) 118, and a flux detector unit (FDU) 126 as shown in FIG. 1. Each AHC 129 utilizes rate gyro 127 and accelerometer 128 sensor signals for angular rate and linear acceleration and digitally processes this data to obtain 3-axis angle, rate, and acceleration information. The sensors used in an attitude heading system are typically analog sensors. Each AHC 129 receives true airspeed from its respective ADS (119 or 120), magnetic flux sensor signals from the flux detector unit 126, compass compensation from the ECU 118 and other sensor signals as appropriate. The FDU 126 uses a pendulous sensing element to detect the direction of the magnetic field of the earth. The ECU 118 provides alignment and compass correction data to cancel compass errors caused by misalignment of the FDU 126 in the aircraft. The ECU data is supplied to the AHC 129 where it is used to compute stabilized magnetic heading. Each AHC 129 supplies attitude, stabilized magnetic heading, and linear acceleration outputs to the PFD 105, MFD 110, FCS 115 and other systems not shown on FIG. 1 such as weather radar and lightning detection systems.

Dual engine indication systems (EIS) 130 acquire, concentrate, and transmit engine data from analog and digital sensors. Each EIS (130) is comprised of two independent halves. In the exemplary system each half EIS 130 interfaces to its own sensors. The sensors include the N1 131 turbine speed sensors and the N2 132 intermediate compressor turbine speed sensors. These sensors are pulse counting tachometer functions that are inherently digital in nature. The inter turbine temperature sensor 133 is an analog sensor. Other sensors (not shown) associated with the EIS 130 may include engine oil temperature and oil pressure. The data from the engine indication systems are provided to the PFD 105 and MFD 110.

The flight control system 115 in FIG. 1 may be an integrated three-axis autopilot with yaw damper, flight guidance, and automatic pitch trim. The FCS 115 may be a dual system made up of two flight guidance computers (FGC) (not shown), an auto pilot panel (APP) (not shown), a mode select panel (MSP) (not shown), and three primary servos (not shown). The autopilot provides control signals required driving aileron and elevator servos in response to commands from a flight guidance portion of the FCS. The yaw damper provides control signals to drive a rudder servo as required for yaw damping and turn coordination. The flight guidance portion of the FCS also provides flight director steering commands and mode select data to the PFD 105 based on a currently active flight guidance mode. The FGC of the flight control system receives attitude and heading data from the dual AHS 124 and 125 and air data from the dual ADS 119 and 120. Other data is supplied as appropriate from other systems and controls to operate the flight control system 115.

The electronic flight instrument system (EFIS) 102 of FIG. 1 may be made up of two color liquid crystal displays or cathode ray tubes; a display control panel (not shown); and a course/heading panel (CHP) (not shown). In normal operation, the left display in an aircraft cockpit functions as the PFD (primary flight display) 105 before the pilot and the right display functions as a PFD 105 before the copilot.

Figure 2:
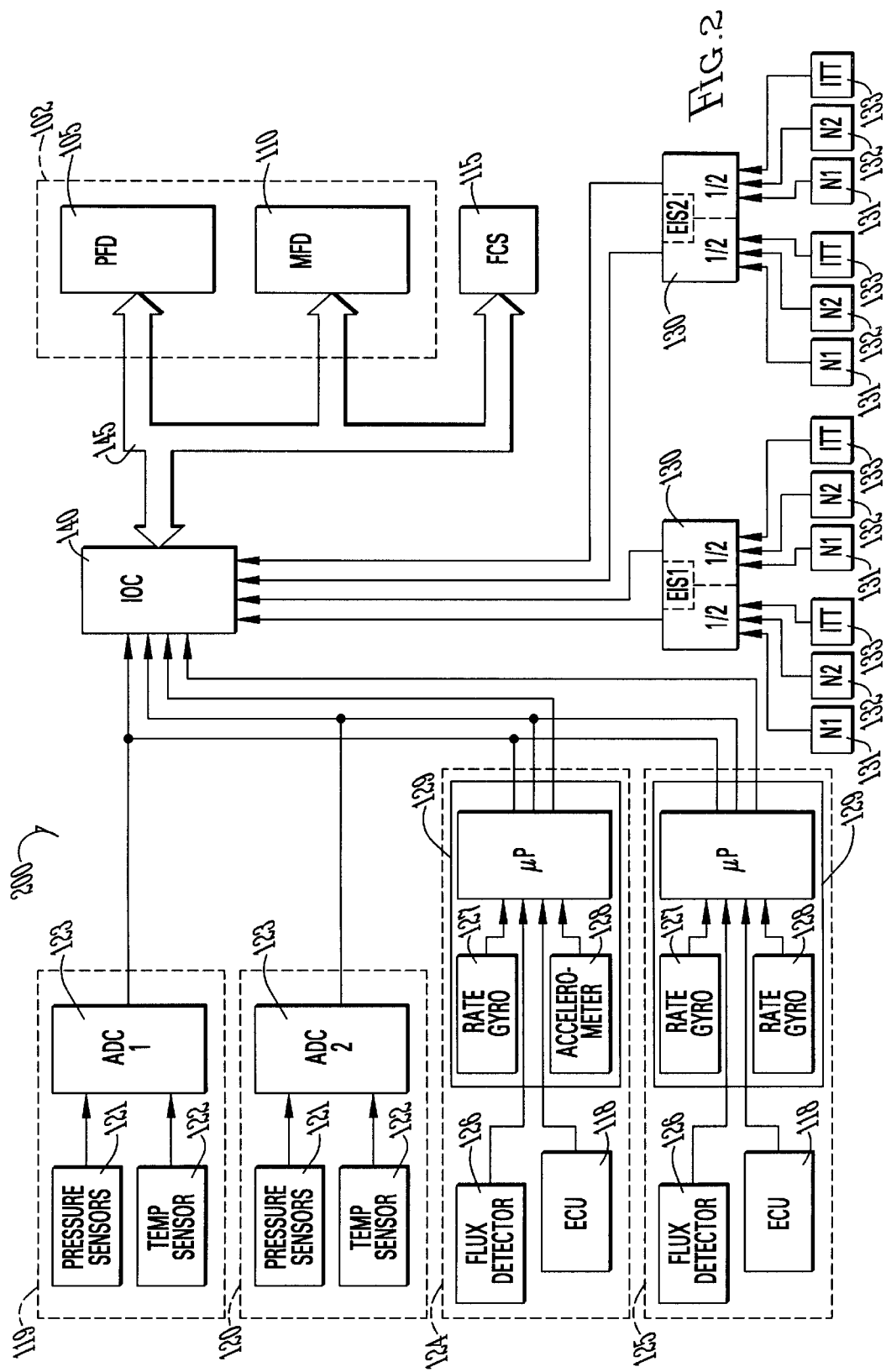
FIG. 2 is a block diagram of an avionics system with multiple sensors connected to an input/output data concentrator.

FIG. 2 shows an alternate embodiment of the avionics system of FIG. 1 that may utilize the present invention. All the systems of FIG. 1 are used in the avionics system 200 in FIG. 2 and retain the same reference number including the dual ADS 119 and 120, the dual AHS 124 and 125, and the dual EIS 130. As with the system of 100 in FIG. 1 other subsystems may be added and the dual systems may be expanded to three or more. The difference between the system of FIG. 1 and that of FIG. 2 is the addition of an input/output concentrator (IOC) 140 for concentrating the data. The IOC 140 receives the data from the dual sources and places it on a data bus 145 such as an Ethernet bus for distribution to the PFD 105, the MFD 110, the FCS 115, and other systems.

An IOC 140 may comprise a processor, memory, and other components. The IOC 140 accepts data inputs on a large number of digital buses and concentrates the desired data, in accordance with preprogrammed tables within the IOC 140, onto a small number of digital output buses. In FIG. 2 a single output bus 145 is shown.

Figure 3:
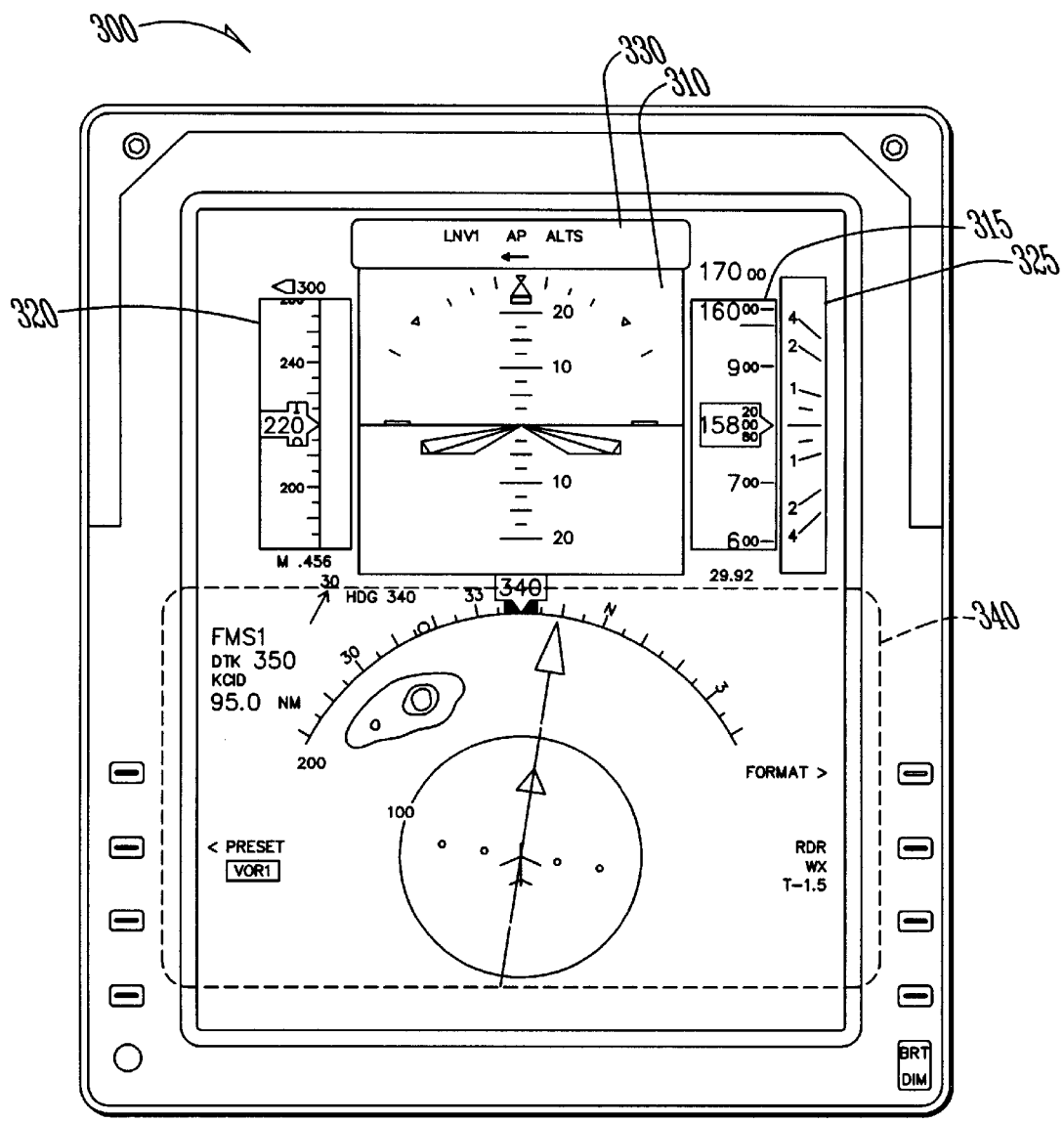
FIG. 3 is a view of the front panel of a primary flight display showing the normal view.

A typical PFD 105 front panel 300 is shown in FIG. 3. The upper region of the PFD 105 is used to display an ADI (attitude director indicator) 310, an altitude scale 315, an airspeed scale 320, and a vertical speed scale 325. Also, flight control system 115 mode information is displayed in the area above the ADI 330, and radio altitude data may also be displayed (not shown). The lower region 340 of the PFD is used to display a compass rose or arc or optional map navigation format as selected by the pilot. The space to either side of the rose, arc, or map format is used to display a lateral navigation data field, a weather radar mode field, system messages and selected menu data. Normal control, reversion, and warning annunciations are also displayed.

Figure 4:
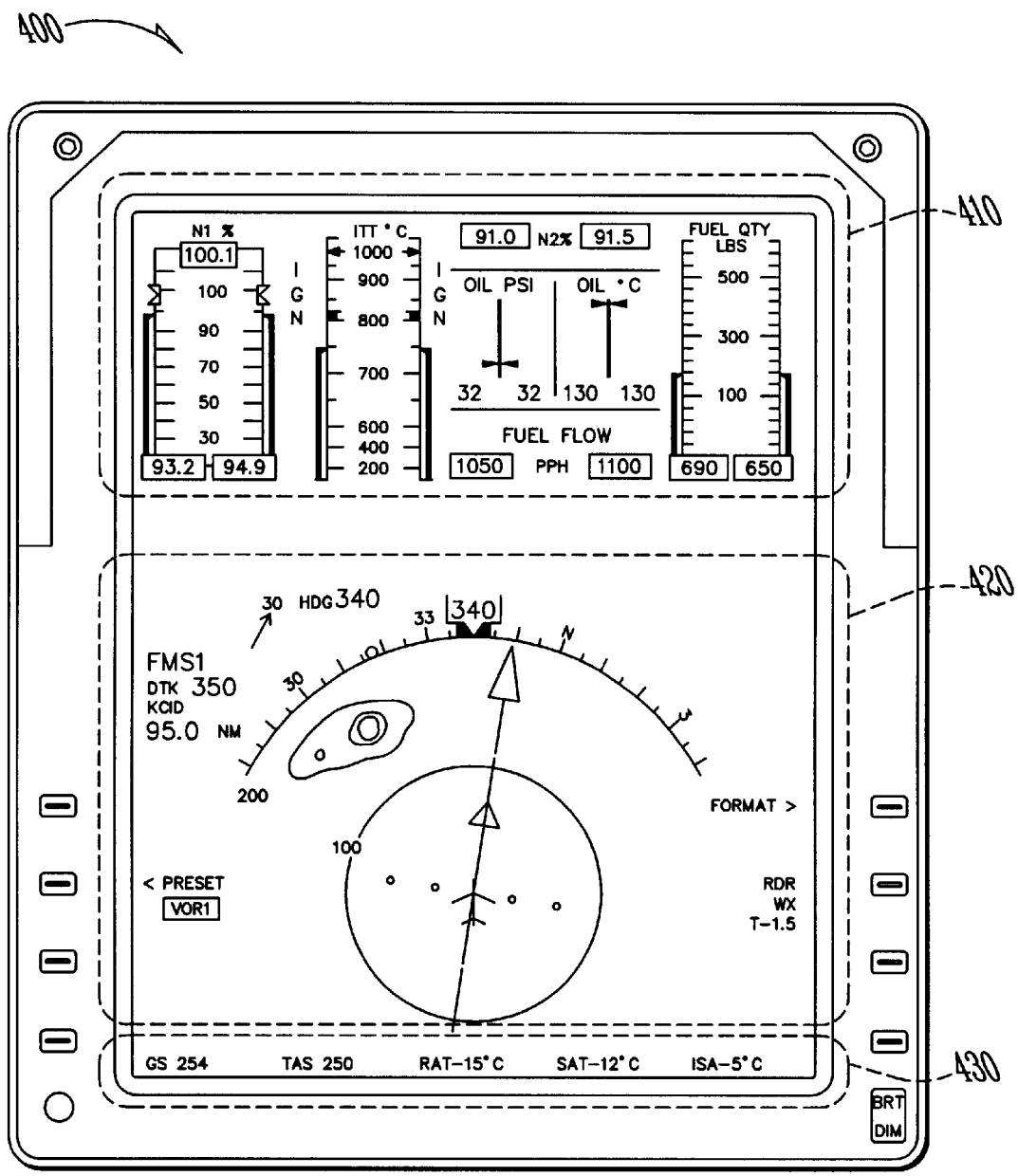
FIG. 4 is a view of the front panel of a multifunction display showing the normal view.

A typical MFD 110 is shown in FIG. 4. The upper region 410 of the MFD 110 is used to display the EIS (Engine Indication System) data. N1, ITT, fuel quantity, N2, fuel flow, oil pressure and temperature are displayed in the EIS field 410. The lower region 420 of the display is similar to the PFD 105. A data line 430 is displayed along the bottom of the MFD with ground speed, true airspeed, and temperature readouts. Normal control, reversion, and warning annunciations are also displayed. To allow for the failure of either the PFD 105 or the MFD 110, each is capable of being pilot configured to a PFD/MFD format. The PFD/MFD format provides all the instrumentation required for the safe operation of the aircraft.

Within the PFD 105, data from the dual ADC 119 and 120, dual AHS 124 and 125, and the dual EIS 130 are processed and sent to a liquid crystal display on the PFD 105 for displaying. In the PFD and MFD processors, the data from the dual independent sensors systems is compared in a data comparator software function to detect failures or incorrect data. Miscompare warnings are used to alert the pilots that data from a same pair of independent sensor systems does not agree within predefined maximum limits. Comparator monitoring is performed full time for attitude and heading data when a pair of attitude heading systems 124 and 125 is installed. Comparator monitoring is performed full time for airspeed and altitude data when a pair of air data systems 119 and 120 is installed. Comparator monitoring is performed full time for N1, N2, and ITT data from each engine indication system 130.

Figure 5:
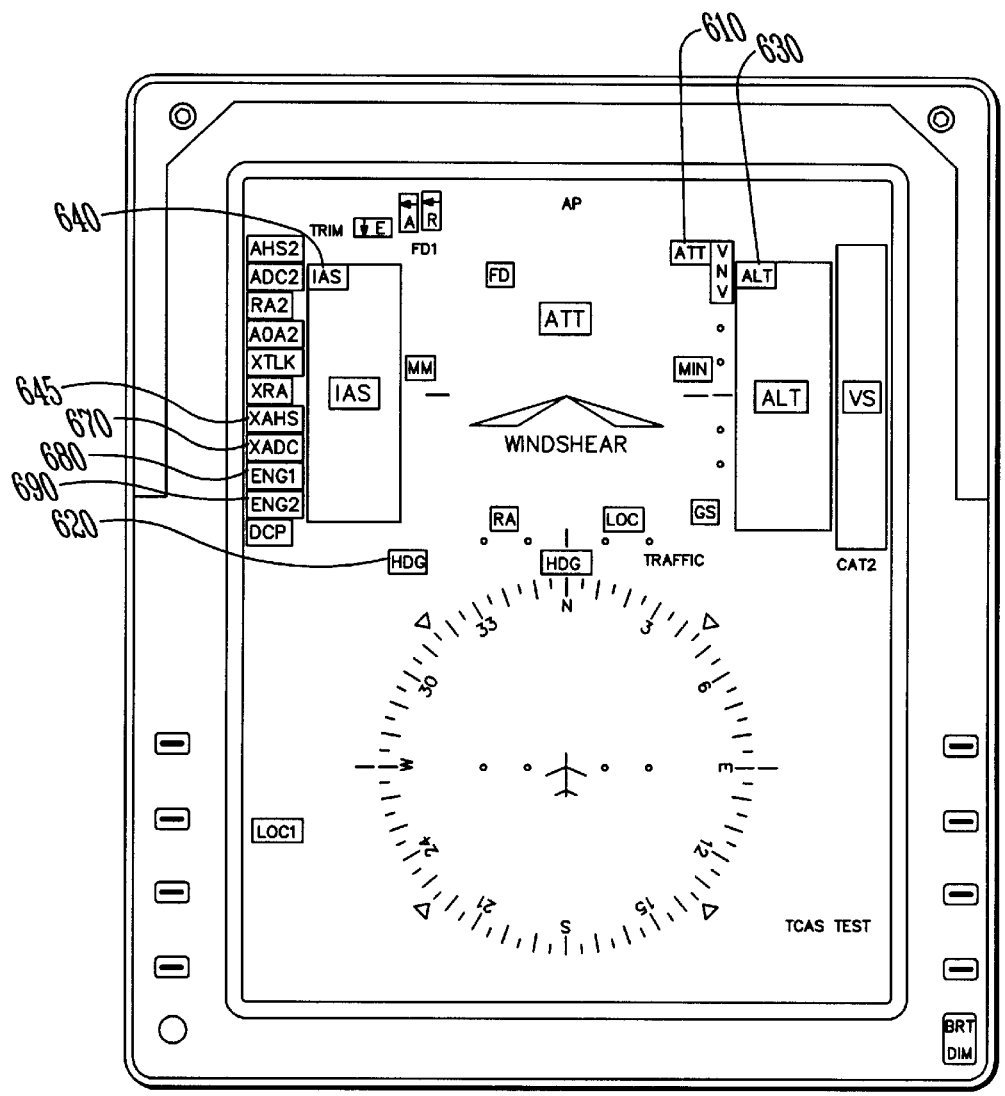
FIG. 5 is a view of the front panel of the primary flight display showing the fault indicators.

The warning indicators of a typical PFD 105 are shown in FIG. 5. The miscompare warning annunciations may be displayed on the PFD liquid crystal display in yellow, flash for 5 seconds when a miscompare condition first exists, and are then steady. The miscompare warning annunciations are removed when the miscompare condition is removed. Other ways of annunciating miscompare warnings may be used. The following paragraphs describe typical warning annunciation conditions and thresholds. Other conditions and thresholds may also be used and other parameters may be monitored.

A pitch comparator is enabled in the PFD 105 when two AHS sources 124 and 125 are provided to the PFD 105 and one is displayed on the PFD 105 to the pilot and the other source is displayed on the PFD to the copilot. When the pitch comparator is enabled, and the pilot's and copilot's pitch difference is greater than ±4 degrees the pitch miscompare warning annunciation 'PIT' is displayed in yellow where 'ATT' 610 is shown in FIG. 5.

A roll comparator is enabled in the PFD 105 when two AHS sources 124 and 125 are provided to the PFD 105 and one is displayed on the PFD 105 to the pilot and the other source is displayed on the PFD to the copilot. When the roll comparator is enabled; and the pilots and copilots roll difference is greater than 4 degrees the roll miscompare warning 'ROL' is displayed in yellow where 'ATT' 610 is shown in FIG. 5.

The pitch and roll comparators are enabled when both sides are not using a common attitude source and both sides are not failed. When the pitch and roll comparators are enabled, and both the pitch and roll comparator limits are exceeded (described above), the pitch and roll miscompare warning 'ATT' 610 is displayed in yellow.

A heading comparator is enabled when both sides are using the same heading type (magnetic or true), both sides are not using a common data source, and both sides are not failed. When the heading comparator is enabled, and the pilot's and copilot's heading difference is greater than 6 degrees, the heading comparator warning 'HDG' 620 is displayed in yellow above and to the left of the compass card.

An altitude comparator is enabled when both sides are not using a common air data source and both sides are not failed. When the altitude comparator is enabled, and the difference between the pilot and copilot's altitude difference is not within limits, the altitude miscompare warning 'ALT' 630 is displayed in yellow on the altitude scale. The comparator limit for altitude is variable and increases as a function of altitude with a difference greater than 60+(ALT1+ALT2)/460).

An airspeed comparator is enabled when both sides are not using a common air data source, both sides are not failed, and the IAS is greater than 90 knots. If the airspeed comparator is enabled and the airspeed difference is greater than 10 knots, the airspeed miscompare warning 'IAS' 640 is displayed in yellow on the airspeed scale.

A No Comparator flag is shown on the PFD when a compared parameter is shown as valid, but no valid data is being received from an installed second source to allow the comparator to work. The No Comparator flags may be boxed and displayed in white, flash for 5 seconds when a No Comparator condition first exists, and are then steady. They are removed when the No Comparator condition is removed.

If valid data is being displayed for one or more attitude and heading parameters from AHS 124, but independently sourced data from AHS 125 required for the display's comparison function for that parameter is not available, then a white 'XAHS' (No Comparator) flag 645 is displayed in the PFD message window to the left of the airspeed scale. The flag is removed when independent sources of data for all three AHS parameters are available, or when all three AHS parameters are flagged as invalid.

If valid data is being displayed for air data parameters from ADS 119, but independently sourced data from ADS 120 required for the display's comparison function for that parameter is not available, then a white 'XADC' (No Comparator) flag 670 is displayed in the PFD message window to the left of the airspeed scale. The flag is removed when independent sources of data for both ADC parameters are available, or when both ADC parameters are flagged as invalid.

If valid data is being displayed for the engine parameters, but independently sourced data required for the display's comparison function for that parameter is not available, then a white 'ENG1' 680 or 'ENG2' 690 No Comparator flag (for the respective engine the parameter is associated with) is displayed in the PFD message window to the left of the airspeed scale. The flag is removed when independent sources of data for all three engine parameters (N1, N2, ITT) are available, or when all three engine parameters are flagged as invalid.

In addition to data from two sources not agreeing within outer exceedance limits or one of the two sources having no data output, a third failure condition may exist. Data from one of the two sources such as from ADC 119 may masquerade as data from the other source such as ADC 120 due to a hardware failure or other failure in the IOC 140 of FIG. 2, in the PFD 105, the MFD 110, or elsewhere. This failure condition is referred to as a common sensor failure and may be detected by comparing the data from the two sources over a period of time to determine if the data from one source is equal or nearly equal to the data from the other source. If this condition exists a failure indication is made on the PFD 105 by displaying an appropriate IAS 640 or ALT 630 annunciator or other annunciator.

A common sensor detector of the present invention detects the common sensor failure. The common sensor detector relies on the analog sensor outputs not being identical between different analog sensors. Analog sensors are used in avionics and other systems. These analog sensors provide the data related to the same event but do not produce the exact same output because of inherent differences in the analog sensor devices. The pressure sensors 121 and temperature sensors 122 of FIGS. 1 and 2 are known in the art and several types of sensors are commercially available that may be used to determine altitude, airspeed, and temperature. The temperature and pressure sensors provide slightly different output values for the same input. Accelerometers 128 and rate gyros 127 known in the art and also available commercially are used to determine attitude and heading also produce slightly different outputs for the same input.

Digital sensors such as the turbine speed sensors N1 131 and N2 132 of FIGS. 1 and 2 are pulse counting sensors such as magnetic field sensors that are mounted on engines near a rotating ferrous element of the engine to count engine rotations. Digital sensors such as these speed sensors produce an exactly equal output over a period of time and would not be suitable for operation with the present invention.

The traditional comparator functions, which establish the outside limits for each of the sensors, as described above, is supplemented by a new inside limit comparator to detect a masquerading or common sensor. For example pitch data from the first AHS 124 may be slightly different than the pitch data from the second AHS 125. This is due to the slight differences in the analog rate gyros 127 and accelerometers 128. When pitch data from the first AHS 124 is identical or almost identical to pitch data from the second AHS 125 as seen by the inside limit comparator in the PFD 105, MFD 110, or IOC 140 for a defined period of time, a common sensor fault is declared and a warning is given to the pilots that independent inputs to the comparator no longer exist.

In a first embodiment of the invention in its simplest implementation, it may be possible to average the data from each sensor for some period of time since the two analog sensors used to provide the data will drift and should not be equal. If the data is equal or almost equal with the difference between the data being zero or almost zero for some predetermined longer period of time, a common sensor fault has likely occurred. For example, if X1 and X2 are pitch values from AHS 119 and AHS 120 respectively the inside limit comparator compares X1 to X2 and if i $X1-X2=0$ or $<0.10$ degrees for $>1$ second then a common sensor failure is detected and the appropriate warning is given on the PFD 105 and the MFD 110. Data difference and time threshold values for each inside limit comparator must be predetermined for each of the critical parameters and for the sensors used.

The invention may be implemented in second embodiment in a digital data system in which a piece of data is a digital word composed of a predetermined number of bits. The digital word has a predefined range and the least significant bit in the word represents minimum resolution. The means of implementing this embodiment of the invention is an iterative process. The process involves the recording of a specified parameter such as heading from two data sources (HDG1 and HDG2) for a specified period of time T, subtracting the two sets of corresponding values (HDG1–HDG2) recorded (stored in a memory) during that time, and ensuring that the result is not zero for at least two comparison cycles. It should be noted that the predefined minimum sensor difference threshold (~HDG) must be greater than zero for this process to work. This implementation is computationally intensive but allows the value of sensor difference (~HDG) to approach zero. In this implementation, over time period T and over two comparison cycles if (HDG1–HDG2)=0 warn the pilot that masquerading data is true.

With ideal conditions the process defined by the above equation should detect a common or masquerading sensor. However potential problems with data latency must be addressed. Intra-sensor transport delays, intersystem transport delays, data filters, and random data jitter are some of the forms of delays that can be found in digital systems. Random data jitter is the variation in time that can be expected in the repetitious delivery of data in a serial data stream. Some amount of data jitter can be expected in all data transport systems and may need to be accounted for in some systems to ensure that data jitter itself does not allow incorrect acceptance of masquerading data. Because T above may represent a relatively short period of time such as one second, it is possible that the above mentioned data delays could effectively hide masquerading data if the data from both sources is taken over the exact same time period T.

To overcome the possibility of various data delays hiding the potential of masquerading data in a third embodiment of the present invention, T for the second source is expanded to cover a defined length of time T' that is long enough to account for all possible system delays. As an example, if T=1 second, then T'=2 seconds may be an acceptable period of time to account for all delays. In this example T' consists of the period of 0.5 second prior to the beginning of time period T, the entire time period T, and the period of 0.5 second after the end of time period T. Data is recorded from source HDG2 for time period T' and data source HDG1 for time period T (T is a subset of T', thus time period T' begins before time period T). The data set recorded from data source HDG1 is subtracted from each equal sized contiguous data set from data source HDG2. The process is started with the data set from HDG2 recorded 0.5 second before T and incremented through the data recorded for HDG2, one digital data word at a time, until all possible equal sized sets of contiguous data have been subtracted. If one or more zero values are detected between any two examined data subsets during this process, it is recorded as a zero value cycle. During the next cycle of operation, if another zero difference between subsets is detected, a second occurrence would be declared true and a second zero value cycle recorded. If the inner comparator detects a specified minimum repetition interval (MRI) of occurrences of zero difference in the data, then masquerading data is declared and a warning given to the pilot. The MRI value is established to prevent random occurrences of exactly equal data from two different sensors falsely indicating masquerading data.

Figure 6:
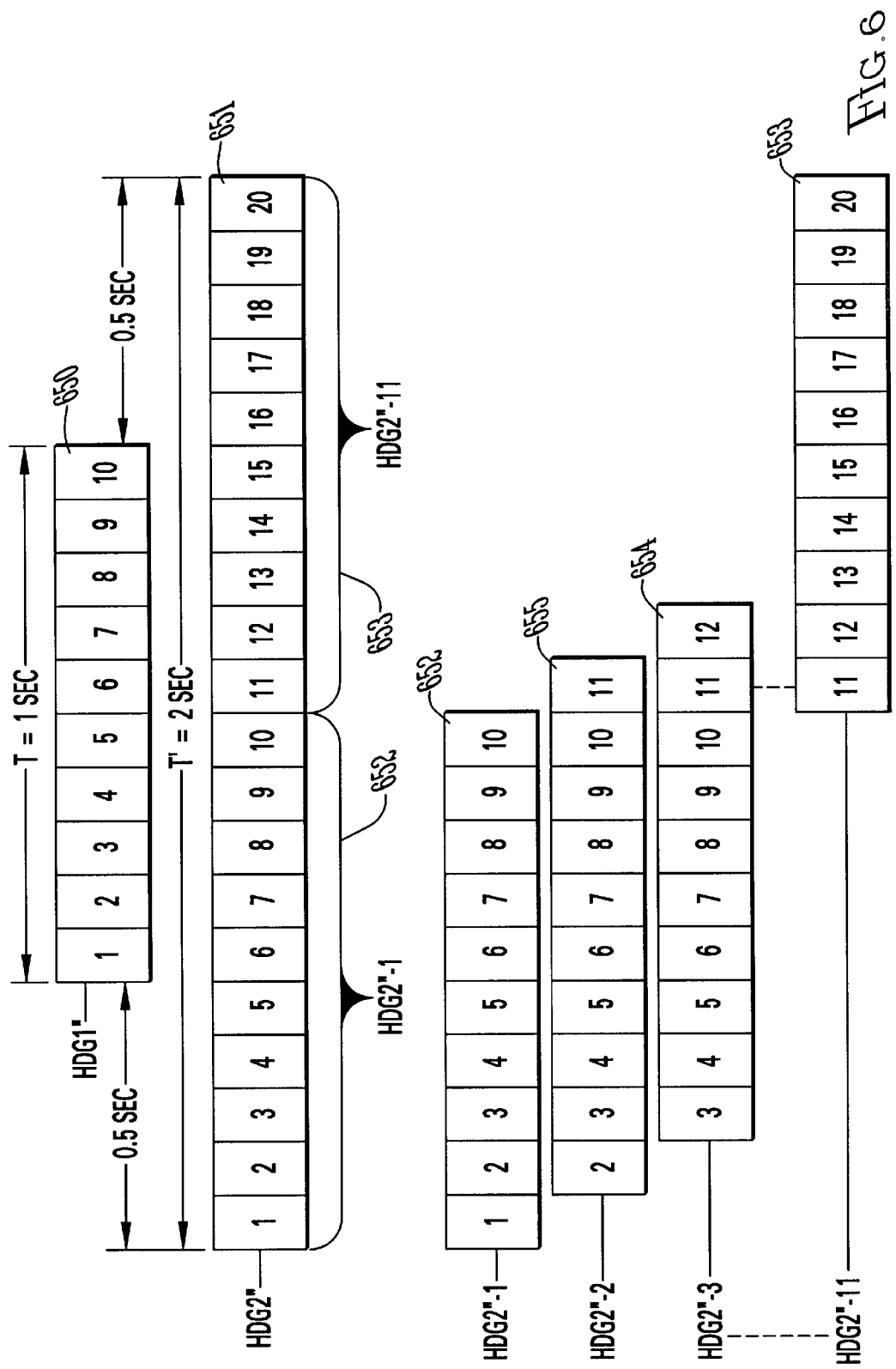
FIG. 6 is a diagram showing data sources and comparison of data between the sources to detect a masquerading sensor according to an embodiment of the invention.

An example of the third embodiment of the invention is shown in FIG. 6. The parameter of interest is again HDG and the repetition rate is 10 Hz, the range of the HDG word is 10 bits, the MRI is 5, and the time frame of interest is 1 second. Ten samples of HDG1 would be stored during period T (HDG1, 1–10). This produces a first set of HDG1 data (HDG1") 650, wherein each individual word (1–10) is comprised of 10 bits. At the time period starting 0.5 seconds prior to the beginning of time period T, T' would begin and the inner comparator would start storing HDG2. At 0.5 seconds after time period T ends, time period T' would end, and 20 samples of HDG2 data will be stored (HDG2, 1–20). This produces a second set of data (HDG2") 651, wherein each individual word (1–20) is also comprised of 10 bits. The set of HDG2" data 651 is divided into 11 subsets of data, each comprised of 10 consecutive words (to match the size of the HDG1" data). Starting with the data recorded at the beginning of T', subsets HDG2"–1 652 through HDG2"–11 653 are created. Each word (1–10) in the set HDG1' 650 is matched with a corresponding word from each subset of HDG2"–1 652 (words 1–10) through HDG2"–11 653 (words 11–20) allowing each word in one subset to be subtracted from a corresponding word in the other subset. In other words, set HDG1' 650 is compared to subset HDG2"–1 652, then to HDG2"–2 655, then to HDG2"–3 654, and so on through HDG2"–11 653. If a zero difference is derived for any subset subtraction operation over all ten data words, a zero value cycle is declared. In this example words 3–12 of subset HDG2"–3 654 match words 1–10 of set HDG1" 650 and a zero difference cycle is declared. In the next comparison cycle if the inner comparator detects another zero value between sets of data (HDG1' 650 and HDG2"–1 652 through HDG2"–11 653), a second consecutive occurrence has taken place. In this example the MRI is 5, so if five consecutive occurrences are detected, then masquerading data is declared and the corresponding annunciation displayed to the pilot.

Figure 7:
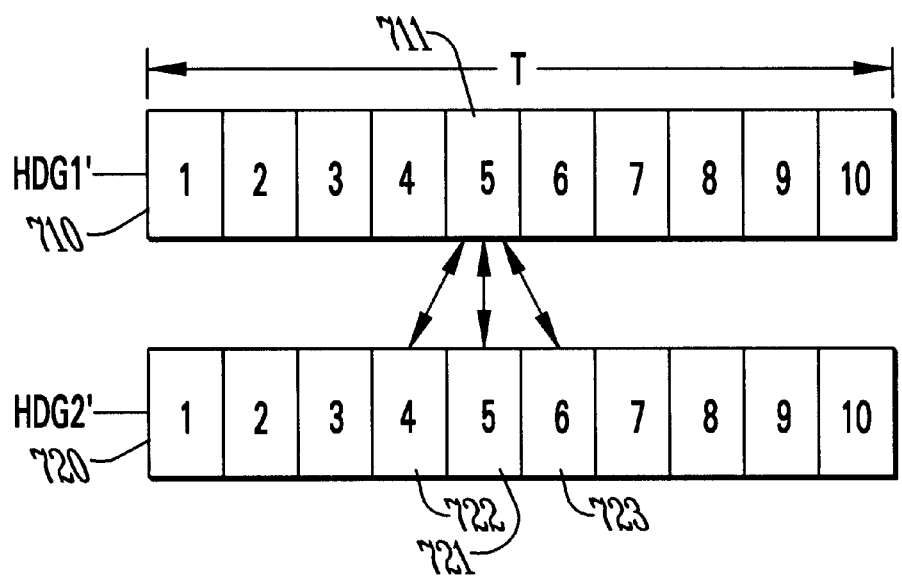
FIG. 7 is a diagram showing data sources and comparison of data between the sources to detect a masquerading sensor according to another embodiment of the invention.

A fourth embodiment of the invention in another a digital implementation is shown in exemplary fashion in FIG. 7. In this embodiment heading data HDG1' 710 and HDG2'720 is recorded from two sources, HDG1 and HDG2, over a one second interval T. With a 10 Hz repetition rate ten digital data words are stored over the one-second period. Assuming a data jitter of ±1 word for each data input, comparisons are made by the inside limit data comparator of data HDG1' 710 and HDG2' 720 early by one word, between words, and late by one word to accommodate the data jitter. Specifically in FIG. 7 word 5 (711) of HDG1' (710) is to be compared with words 4 (722), 5 (721), and 6 (723) of HDG2' (720). If this comparison results in a zero data difference, a zero value offset value is determined (–1, 0, +1 in this example). The offset value is used to offset the incoming values of HDG2 to see if a continuous zero value is obtained by subtracting the two data streams. If a continuous zero value is obtained, a warning is given to the pilot.

The inside limit comparator function to detect common sensor faults may also be included in the software of the MFD 110 or the IOC 140 of FIG. 2 in an identical manner to that described for the PFD above.

Figure 8:
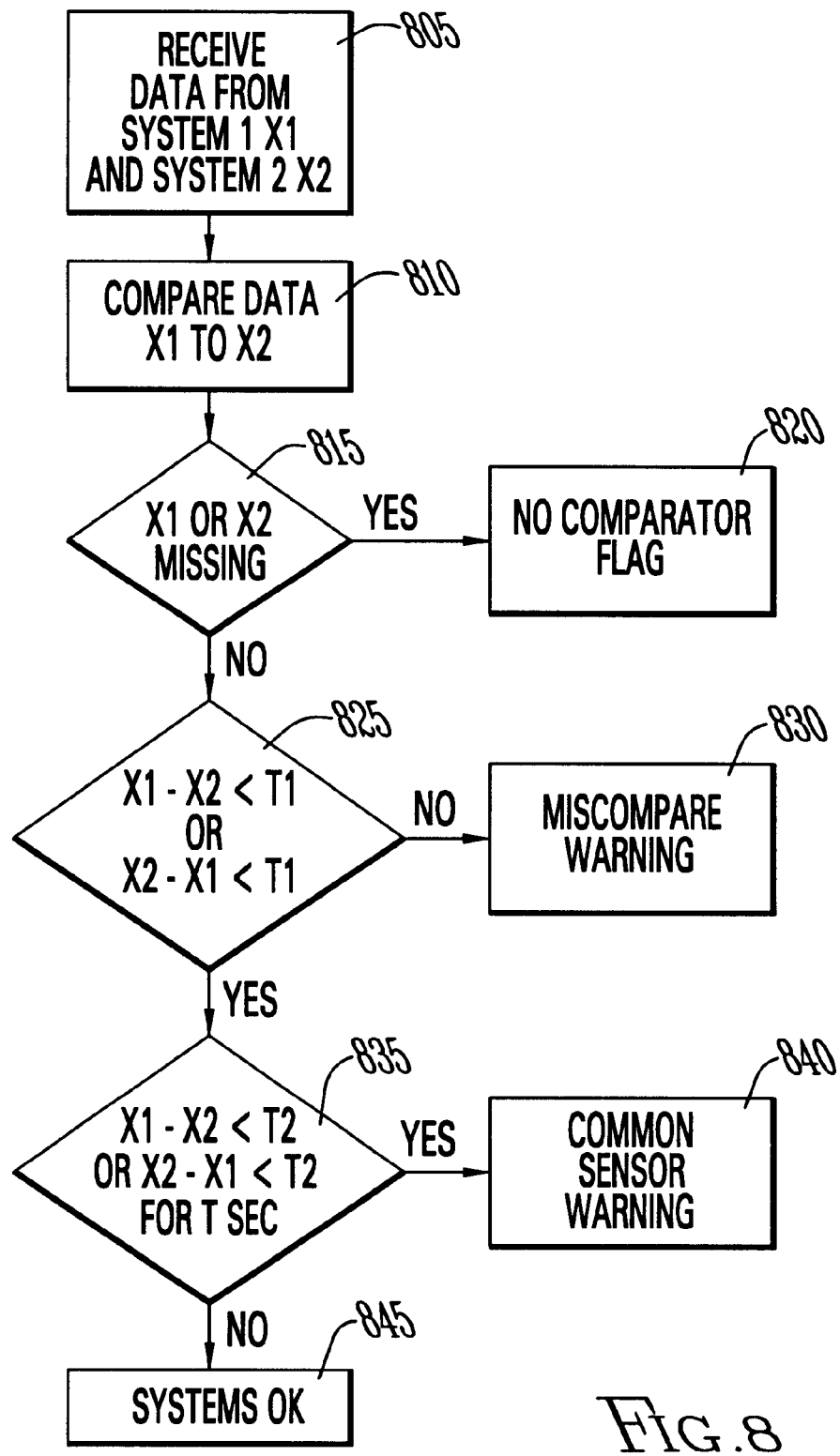
FIG. 8 is a flowchart of exemplary software operation for the inside limit comparator to detect a common sensor condition.

An exemplary flow chart for software that may perform the common sensor detector function and the traditional comparator functions of miscompare and no comparator that may be included in either the IOC 140 of FIG. 2 or the PFD 105 and MFD 110 in FIGS. 1 and 2 is shown in FIG. 8. The first embodiment described above is shown in this flow chart but the other disclosed embodiments may be substituted. The comparator functions start with data X1 being received from system 1 and data X2 being received from system 2 at step 805 in FIG. 8. As previously described, the data may come from an air data system, an attitude heading system, and an engine indication system in avionics systems applications or any safety critical system. The data X1 from system 1 is compared to the data X2 from system 2 at step 810. If data X1 or data X2 is missing at step 815 then a no comparator flag is indicated by a display at step 820. If both X1 and X2 are present, a comparison of X1 and X2 is made to determine if one exceeds the other by some predetermined threshold T1 at step 825. If the difference exceeds T1 a miscompare warning is indicated by the display at step 830. If the difference between X1 and X2 is less than the T1 threshold, then the comparison of X1 to X2 is checked to see if the difference is between zero and threshold T2 for some period of time greater than t at step 835. If the comparison indicates that the difference is between zero and T2 for greater than t, then a common sensor warning is indicated by the display at step 840, otherwise the systems are operating properly as indicated at step 845. The exemplary flow chart of FIG. 8 shows the comparator software operation in a series fashion. The comparator software may also perform the three comparisons in a parallel or simultaneous fashion (not shown).

The avionics system 100 of FIGS. 1 and 2 incorporating the common sensor detector of the present invention described above may be used in other safety critical systems such as nuclear power plant monitoring. As an example, the air data systems 119 and 120 may be replaced with reactor monitoring systems. The pressure 121 and temperature sensors 122 may monitor safety critical system parameters within a nuclear reactor and provide sensor data associated with these parameters. The air data computers 123 may be replaced with a pair of computers that receive the same sensor data and may compute the system parameters related to the pressure and temperature sensor data from the nuclear reactor. The attitude heading systems 124 and 125 may be replaced with radiation monitoring systems with the flux detectors 126 being replaced with radiation detectors. The attitude heading computers 129 may be replaced with computers that process radiation sensor data and send the data to a display. The display may take the place of the primary flight display 105 and may be supplemented by a second display taking the place of the multifunction display 110. The system operation and the operation of the present invention is the same for both an avionics system, a nuclear power plant monitoring systems, or other safety critical systems.

It is believed that the safety critical system with a common sensor detector of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A safety critical system capable of detecting a common sensor fault condition comprising:
   a plurality of sensors for sensing safety critical system parameters and for providing sensor data associated with the safety critical system parameters;
   a plurality of computers for receiving the sensor data and computing system parameter data associated with the sensor data from the plurality of analog sensors; and
   a data display for receiving, processing, and displaying the system parameter data wherein the data display further comprises a plurality of inside limit data comparators to compare the system parameter data from at least a same pair of the plurality of computers to detect a common sensor fault condition when the system parameter data difference is zero or approximately zero for a predetermined period of time.

2. The safety critical system of claim 1 further comprising an input/output concentrator for receiving the system parameter data from the plurality of computers and concentrating the system parameter data for transferring to the plurality of data displays.

3. An avionics system capable of detecting a common sensor fault condition and for mounting in an aircraft comprising:
   a plurality of analog sensors for sensing flight parameters of the aircraft and for providing sensor signals indicative of the flight parameters;
   a plurality of avionics computers for computing flight parameter data associated with the sensor signals from the plurality of analog sensors; and
   a primary flight display for receiving, processing, and displaying the flight parameter data wherein the primary flight display further comprises a plurality of inside limit data comparators to compare the flight parameter data from at least a same pair of the plurality of flight computers to detect the common sensor fault condition when the flight parameter data difference is zero or approximately zero for a predetermined period of time.

4. The avionics system of claim 3 further comprising a multifunction display for receiving, processing, and displaying the flight parameter data wherein the multifunction display further comprises a plurality of inside limit data comparators to compare the flight parameter data from at least a same pair of the flight computers to detect the common sensor fault condition when the flight parameter data difference is zero or approximately zero for a predetermined period of time.

5. The avionics system of claim 3 wherein the same pair of avionics computers are air data computers.

6. The avionics system of claim 5 wherein the plurality of analog sensors includes pressure sensors and temperature sensors.

7. The avionics system of claim 3 wherein the same pair of avionics computers are attitude heading computers.

8. The avionics system of claim 7 wherein the plurality of analog sensors includes rate gyros, accelerometers and flux detectors.

9. An avionics system with a common sensor detector comprising:
   a plurality of air data systems for measuring air data parameters and providing air data;
   a plurality of attitude heading systems for measuring attitude and heading data parameters and providing attitude and heading data; and
   a primary flight display for receiving, processing, and displaying the air data and attitude and heading data wherein the primary flight display further comprises a plurality of inside limit data comparators to compare the data from the air data systems or the attitude heading systems and to detect a common sensor fault condition when the data difference is zero or approximately zero for a predetermined period of time.

10. The avionics system of claim 9 wherein the plurality of air data systems further comprise:
    a plurality of pressure and temperature sensors for providing pressure and temperature sensor signals; and
    a plurality of air data computers for computing air data parameters associated with the pressure and temperature sensor signals from the plurality of pressure and temperature sensors.

11. The avionics system of claim 9 wherein the a plurality of attitude heading systems further comprise:
    a plurality of flux detector, rate gyro, and accelerometer sensors for providing flux detector, rate gyro, and accelerometer sensor signals; and
    a plurality of attitude heading computers for computing attitude and heading data parameters associated with the flux detector, rate gyro, and accelerometer sensor signals from the plurality of flux detector, rate gyro, and accelerometer sensors.

12. The avionics system of claim 9 wherein the primary flight display further comprises a plurality of outside limit data comparators to compare the data from the air data systems or the attitude heading systems and to detect a miscompare fault condition when a data difference from the air data systems or the attitude heading systems exceeds a predetermined difference.

13. The avionics system of claim 9 further comprising a multifunction display for receiving, processing, and displaying the air data and attitude and heading data wherein the multifunction flight display further comprises a plurality of inside limit data comparators to compare the data from the air data systems and to compare the data from the attitude heading systems and to detect a common sensor fault condition when the data difference is zero or approximately zero for a predetermined period of time.

14. An avionics system with a common sensor detector comprising:
    a plurality of air data systems for measuring air data parameters and sending air data;
    a plurality of attitude heading systems for measuring attitude and heading data parameters and sending attitude and heading data;
    an input/output concentrator for receiving, concentrating, and sending the air data and the attitude and heading data wherein the input/output concentrator further comprise a plurality of inside limit data comparators to compare the data from the air data systems and to compare the data from the attitude heading systems to detect a common sensor fault condition when the data difference is zero or approximately zero for a predetermined period of time; and
    a primary flight display for receiving the air data and attitude and heading data from the input/output concentrator and processing and displaying the air data, attitude and heading data, and fault conditions.

15. An avionics system capable of detecting a common sensor and for mounting in an aircraft comprising:
    a plurality of analog sensors for sensing flight parameters of the aircraft and for providing sensor signals indicative of the flight parameters;

a plurality of avionics computers for computing flight parameter data associated with the sensor signals from the plurality of analog sensors wherein the flight parameter data comprises a plurality of flight parameter digital words; and a primary flight display for receiving, processing, and displaying the flight parameter data wherein the primary flight display further comprises a plurality of inside limit data comparators to compare the flight parameter data from at least a same pair of the plurality of flight computers to detect a common sensor fault condition when the flight parameter data difference is zero for corresponding digital words in the plurality of digital words from the same pair of flight computers for at least two comparison cycles.

16. A method of detecting a common sensor fault in a safety critical system comprising the steps of:

sensing safety critical system parameters with two or more analog sensors;

providing analog sensor signals from the analog sensors indicative of the safety critical system parameters;

processing the analog sensor signals received from the analog sensors in at least two safety critical system computers into safety critical system data;

sending the safety critical system data from the safety critical system computers;

receiving the safety critical system data from the safety critical system computers with a safety critical system display;

displaying the safety critical system data on the safety critical system display;

comparing the safety critical system data received from the safety critical system computers in the safety critical system display; and indicating a safety critical system data fault on the safety critical system display when the comparison of the data results in a zero or approximate zero difference for a predetermined period of time.

17. A method of detecting a common sensor fault in an avionics system comprising the steps of:

sensing air data parameters with two or more air data systems;

processing the sensed air data parameters in the air data systems into air data;

sending air data from the air data systems;

sensing attitude and heading parameters with two or more attitude heading systems;

processing the sensed attitude and heading parameters into attitude and heading data;

sending attitude and heading data from the attitude heading systems;

receiving the air data from the air data system and the attitude and heading data from the attitude heading system with a primary flight display;

displaying the air data and attitude and heading data on the primary flight display;

comparing the air data received from the two or more air data systems;

indicating air data fault on the primary flight display when the comparison of the air data results in a zero or approximate zero difference for a predetermined period of time;

comparing the attitude and heading data received from the two or more attitude heading systems; and indicating attitude and heading fault on the primary flight display when the comparison of the attitude and heading data results in a zero or approximate zero difference for a predetermined period of time.

18. A method of detecting a common sensor fault in an avionics system installed in an aircraft comprising the steps of:

sensing flight parameters of the aircraft with a plurality of analog sensors;

providing sensor signals indicative of the flight parameters from the plurality of analog sensors;

computing flight parameter data associated with the sensor signals from the plurality of analog sensors with a plurality of avionics computers;

receiving the flight parameter data in a primary flight display;

comparing data sets of the flight parameter data from at least a same pair of the plurality of flight computers in a plurality of inside limit data comparators within the primary flight display;

detecting a zero difference with an inside data comparator when the flight parameter data difference is zero between equal size contiguous data sets of the flight parameter data from the same pair of flight computers; and annunciating the common sensor fault condition when one or more comparison cycles have a zero difference.

19. The method of claim 18 wherein the step of comparing flight parameter data the inside data comparator further comprises;

recording a first data set from a first avionics computer in the plurality of avionics computers over a predetermined period of time wherein the first data set comprises a first plurality of digital data words;

recording a second data set from a second avionics computer in the plurality of computers starting at a time prior to the predetermined period of time, through the predetermined period of time, and stopping at a time after the predetermined period of time wherein the second data set comprises a second plurality of digital words;

comparing the first data set to an equal sized contiguous subset of the second data set starting at the time prior to the predetermined time wherein the equal sized contiguous subset comprises a number of digital words equal to the first plurality of digital words;

comparing the first data set to a next equal sized contiguous subset of the second data set starting a time later by one digital word than the time prior to the predetermined period of time;

continuing the comparison of the first data set to a next equal sized contiguous subset of the second data set until a last equal sized contiguous subset is compared wherein the last equal sized data subset has a last data word ending at the time after the predetermined period of time; and repeating the steps of comparing the flight parameter data as claimed above in a next comparison cycle.

20. A method of detecting a common sensor fault in an avionics system with an inside limit data comparator installed within the avionics system comprising the steps of:

recording data words arriving from a first source in the avionics system for a predetermined time interval;

recording data words arriving from a second source in the avionics system for the predetermined time interval;

comparing a data word from the first source to an earlier data word from the second source;

comparing the data word from the first source to a data word arriving at a same time from the second source;

comparing the data word form the first source to a later data word from the second source;

determining a zero offset value if comparing the data word from the first source to the earlier data word, to the data word arriving at the same time, or the later data word from the second source results in a zero data difference wherein the offset value equals the number of words the second data words is earlier, at the same, or later than the first data word;

offsetting the data words arriving from the second data source by the zero offset value;

subtracting the data words from the first source from the offset data words from the second source; and warning a pilot of the common sensor fault when the subtracting of the data words from the first source from the offset data words from the second source results in a continuous zero value.

* * * * *